United States Patent Office 2,901,916
Patented Sept. 1, 1959

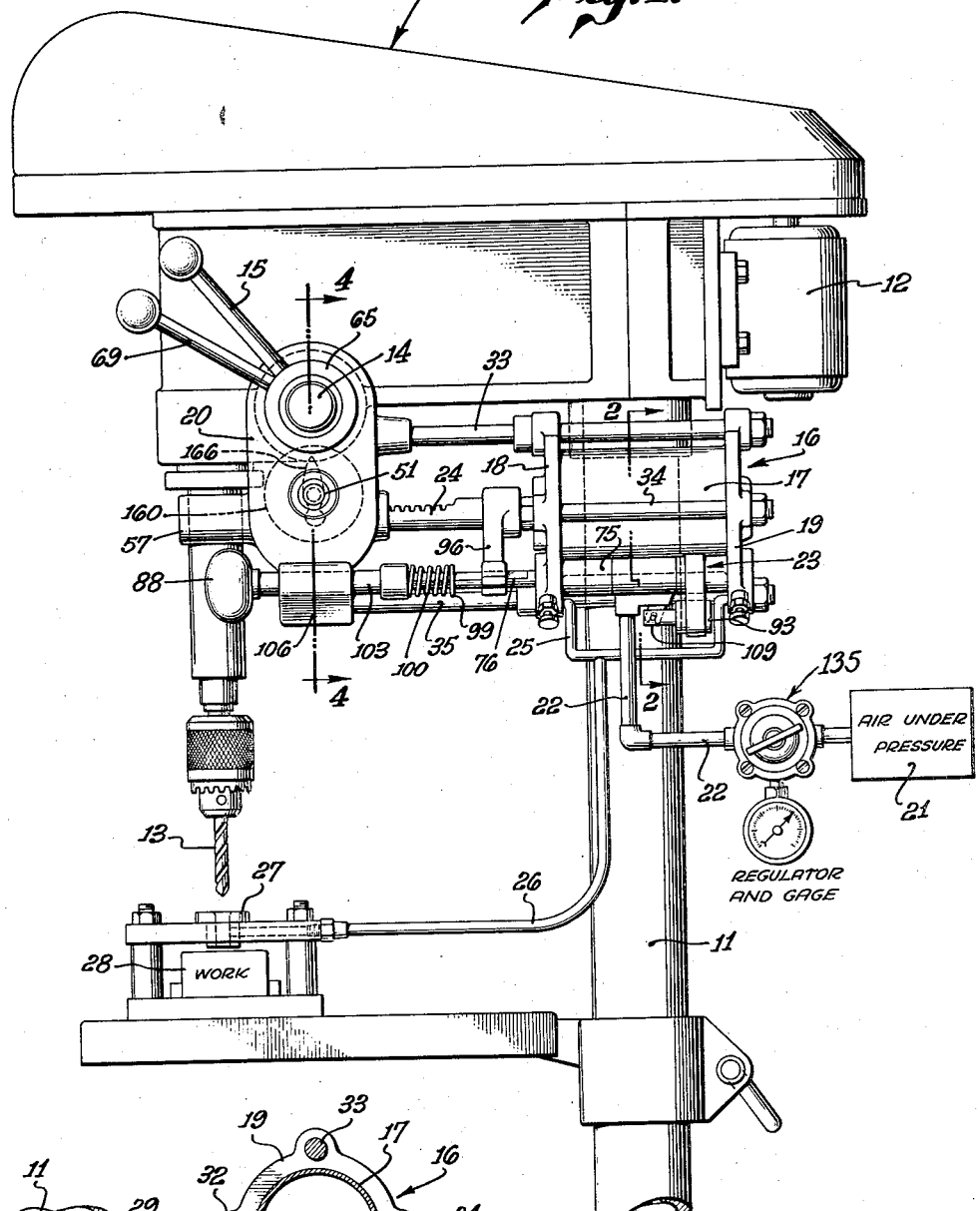

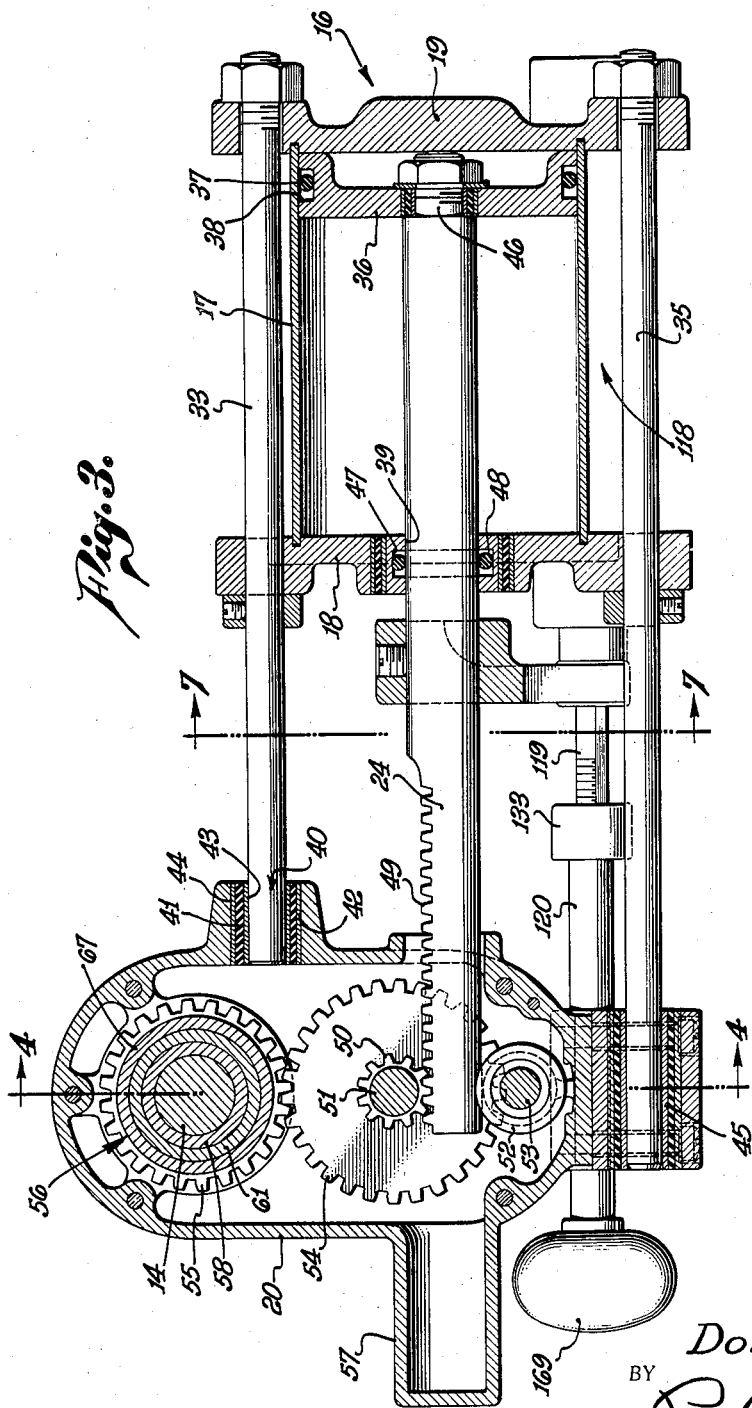

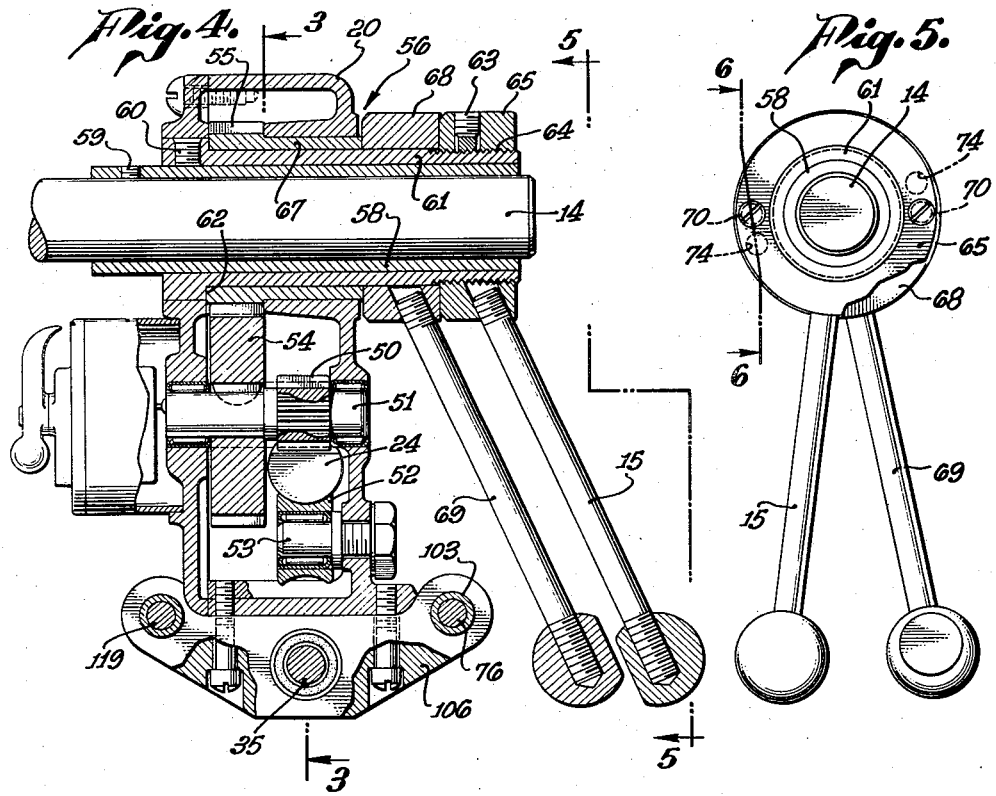
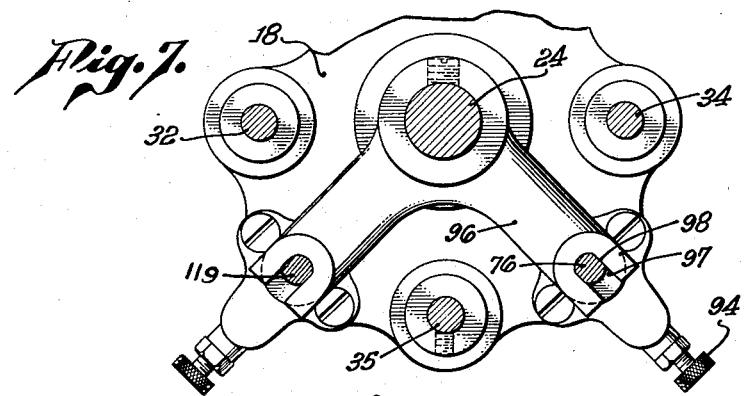
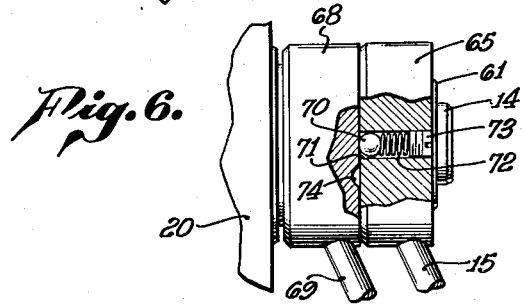

2,901,916

CLUTCH CONTROLLED DRIVE MECHANISM FOR MACHINE TOOLS

Don Heyer, El Monte, Calif.

Original application January 31, 1946, Serial No. 687,401, now Patent No. 2,624,319, dated January 6, 1953. Divided and this application December 24, 1952, Serial No. 327,755

8 Claims. (Cl. 74—422)

This invention relates to apparatus for effecting relative advance and withdrawal between a tool and the work upon which the tool is to operate, as in a drill press or similar machine.

The present application is a division of the application, Serial Number 687,407, filed January 31, 1946, which issued on January 6, 1953, as U.S. Patent Number 2,624,319, and relates to the clutch controlled drive means as embodied in the apparatus shown in said patent for the purpose of effecting longitudinal movement of the spindle of a drill press or of a similar tool supporting member.

It is an object of this invention to provide a drive means of the character described, which effects the desired longitudinal movement of the spindle responsive to a comparatively small movement of an actuating member, for example, a short stroke of a plunger or piston rod.

It is another object hereof to provide a drive unit such as described, which by reason of its simplicity, compactness, and small size readily lends itself to use in connection with any apparatus employed for effecting a power operation of the spindle of various types of drill presses and the like to move the tool into and out of contact with the work.

In accordance with the invention, the drive unit, including a driven sleeve mounted on a shaft which effects reciprocation of a drill spindle or the like, is adapted to pivot about the shaft to permit its being angularly located at a position best suited to a selected machine, and means carried by the unit, and including a clamp, is employed to maintain the unit or apparatus of the invention in such a position, such clamp being connectible to a fixed part of the machine.

This invention possesses many other advantages and has other objects which may be made more easily apparent from a consideration of one embodiment of the invention. For this purpose there is shown in the drawings accompanying and forming part of the present specification, a form of this invention exemplified as applied to a drill press having a spindle which controls the longitudinal position of a drill bit with respect to the work into which the bit is designed to penetrate. This form will now be described in detail, illustrating the general principles of the invention. It is to be understood that, while exemplified in apparatus applied to a drill press, the teachings of this invention are similarly applicable to many types of machines and machine tools; therefore this detailed description is not to be taken in a limiting sense, since the scope of the invention is best defined by the appended claims.

Referring to the drawings:

Figure 1 is a side elevation of a drill press with the powered driving apparatus of the present invention mounted thereon;

Figure 2 is a sectional elevational view taken along line 2—2 of Figure 1, showing a portion of the mounting means for securing the apparatus of this invention to a drill press;

Figure 3 is a sectional view taken along line 3—3 of Figure 4, showing the driving cylinder and piston, together with the rack and pinion connection to the clutch shown in Figures 4, 5 and 6;

Figure 4 is a sectional view taken on line 4—4 of Figures 1 and 3, showing particularly the clutch arrangement and related gearing assembly through which motion of the driving means is transmitted to the conventional spindle control shaft of the drill press;

Figure 5 is an elevational view taken along line 5—5 of Figure 4, showing the clutch control handles positioned for powered operation of the drill, i.e., for clutch engagement;

Figure 6 is an elevation partially sectioned, taken along line 6—6 in Figure 5; and Figure 7 is a section along line 7—7 of Figure 3.

Referring now specifically to Figure 1, there is shown a conventional form of drill press 10, having an upright standard 11, a drill rotating motor 12, and a drill bit 13. Bit 13 is raised and lowered in accordance with the angular position of rotatable spindle control shaft 14 controlled by handle 15, which latter may form a portion of the control apparatus of this invention.

Mounted on the conventional drill press thus far described is the air-powered driving means 16 of this invention, including a cylinder 17 having end plates 18 and 19, to which is preferably secured a clutch housing 20, the latter being mounted over spindle control shaft 14. A suitable source 21 of air under pressure is connected through pipe 22 to a valve 23 preferably formed as a unitary structure with cylinder 17 and utilizing end plates 18 and 19.

Air from source 21, applied selectively through valve 23 to cylinder 17, serves to reciprocate a rack 24 coupled through gearing and clutch means in housing 20 to shaft 14, thereby raising and lowering drill bit 13. Air exhausted from cylinder 17 returns through valve 23 to outlet pipes 25 forming a common duct at 26 leading to a hole in bit guide 27 affixed above the work 28. In this manner, an intermittent flow of air is discharged against the rotating bit 13 during operation thereof.

The several portions of the assembly thus far described generally will now be fully described in detail.

It will be seen with reference to Figs. 1, 3 and 4 that the housing 20 is supported on the shaft 14 for angular adjustment relative thereto. This housing also supports the driving means 16 including the cylinder 17. As shown in Fig. 3, bolts 33 and 35 extend laterally from the housing 20 as a means for supporting the driving means 16. Other bolts 32 and 34 hold the end plates 18 and 19 in place on the cylinder 17.

When the unit including the housing 20, its contents and the driving means 16, is installed on the shaft 14, the unit may be angularly adjusted on the shaft to a position best suited to the particular machine. This adjustment provision is important, as in some machines the parts thereof are located so that it is necessary to adjust the unit to a position above or below the horizontal. After this adjustment, the clamping means 29 as shown in Fig. 2 is employed to hold the unit against movement out of adjusted position. This clamping means includes a split ring 29a vertically adjustably mounted on the standard 11 and adapted to be held in adjusted position by a clamping bolt 30. A clamp 31 carried by the split ring 29a is operable to grip one of the bolts supporting the cylinder 17, for example the bolt 32, to hold the adjustable unit supported on the shaft 14 against movement out of adjusted position.

Referring particularly to Figure 3 showing the driving means 16 and housing 20, it will be seen that the right hand end of rack 24 constitutes a piston rod to which is attached, within cylinder 17, a piston 36 having a piston ring 37 forming an air-tight, slidable seal between piston 36 and the inside wall of cylinder 17, and preferably in the form of a toroid of elastic material such as oil resistant synthetic rubber. As is known in the art, ring 37 is free to roll slightly in annular groove 38 in the edge of piston 36. In so doing it stretches, thereby forming a good air seal between piston 36 and the inside of the wall of cylinder 17.

Inasmuch as driving means 16 is mounted on one portion of drill press 10 and housing 20 is mounted on another portion thereof, it is desirable to provide that the mounting and other connections between driving means 16 and housing 20 shall be pliant within small limits. To this end the engagement of rack 24 with piston 36, and the port 39 through which rack 24 emerges from cylinder 17 include pliant mounting means. Such a mounting means is shown, for example, at end 40 of rod 33, in the form of a sleeve 41 of resilient material, such as oil resistant synthetic rubber interposed between end 40 and opening 42 in housing 20 in which end 40 is received. The pliant mounting means includes, in addition to resilient sleeve 41, inner and outer metal sleeves 43 and 44, respectively. Similar pliant mounting means are provided at 45 on extended bolt 35 and at 46 where rack 24 is attached to piston 36; also around port 39 where rack 24 emerges from cylinder 17 through end plate 18. It will be noted that end plate 18 at port 39 includes a groove 47 and elastic ring 48 functioning in the manner described for groove 38 and elastic ring 37 of piston 36.

Teeth 49 of rack 24 coact with pinion 50 mounted on shaft 51 journaled in housing 20, being held thereagainst by a saddle shaped roller 52 (Figure 4) mounted on shaft 53 likewise journaled in housing 20.

To transmit reciprocation of the rack 24, impelled by air-powered driving means 16, to spindle control shaft 14, a gear 54 also mounted on shaft 51 meshes with a gear 55 journaled coaxially around shaft 14 and coupled thereto through an illustrative clutch 56 to be presently described in connection with Figure 4. Extreme forward movement of piston 36 necessitates the inclusion of a hollow boss 57 on housing 20 for the reception of the end of rack 24.

Clutch 56 is shown in detail in Figure 4, which also illustrates the manner in which housing 20 is mounted on shaft 14.

To accommodate the apparatus of this invention to spindle control shafts of various diameters, a bushing 58 is provided, which is secured to shaft 14 by means of set screw 59. Mounted on bushing 58 and secured thereto by a set screw 60, is a sleeve 61 having an annular shoulder 62 at one end thereof. On the other end of sleeve 61 from shoulder 62 is mounted, by means of set screw 63 and threads 64, a collar 65 from which extends a control handle 15. The outer surface of sleeve 61 constitutes a bearing surface on which is rotatably mounted a sleeve 67 preferably formed integral with gear 55. It will be noted that sleeve 67 extends axially a short distance beyond housing 20, where it contacts a collar 68 interposed between collar 65 and sleeve 67 and having also a handle 69 extending therefrom. Collar 68 is mounted on sleeve 61 so as to be axially and angularly slidable thereon.

Reviewing the assembly thus far described, it will be seen that sleeve 67, oscillating in accordance with reciprocation of rack 24 through the coaction of gears 50, 54 and 55, imparts this oscillation to shaft 14 through sleeve 61, and bushing 50, by selective coupling of sleeve 61 with sleeve 67. Such coupling is accomplished through collars 65 and 68 as will be explained in connection with Figure 5.

Selective axial pressure between collars 65 and 68 is effected by the action of a ball 70 (Figures 5 and 6) contained in an axial hole 71 in collar 65 and biased against the surface of collar 68 by a spring 72 held in position by an inset screw 73. To relieve pressure on ball 70 against collar 68, a hemispherical recess 74 is provided in which ball 70 may seat when a predetermined angular relation exists between collars 65 and 68.

When handles 15 and 69 are juxtaposed, ball 70 registers with recess 74 thereby relieving pressure between collars 65 and 68, and shaft 14 is free to turn relative to sleeve 67. Upon relative angular separation of handles 15 and 69, as shown in Figure 6, ball 70 is moved from recess 74, whereupon the pressure of spring 72 against ball 70 and of ball 70 against collar 68 presses collar 68 against sleeve 67, and sleeve 67 against shoulder 62. The frictional engagement thus provided between shoulder 62 of sleeve 61 and sleeve 67, and between the end of sleeve 67 and collar 68 serves to clutch sleeve 61 to sleeve 67, whereby movement of rack 24 is imparted to shaft 14. If desired, a pair of pressure-producing means consisting of the assembly 70, 71, 72, 73 and 74 may be provided as shown in Figure 5, diametrically disposed in collar 65.

Handles 15 and 69, when together, signify "manual" operating position, in which driving means 16 is completely de-coupled from the drill press. Handles 15 and 69, when separated, as shown in Figures 5 and 6, signify the "powered" operating position, in which longitudinal movement of drill bit 13 is controlled by driving means 16.

The manner in which air under pressure is admitted from pipe 22 through valve 23 selectively to either side of piston 36 in order to advance or withdraw bit 13 from work 28 need not be described in detail since this is the subject of my prior Patent No. 2,624,319. Briefly, however, knob 88 (see Fig. 1) may be manually operated to effect actuation of the valve 23 in valve housing 75, the valve being operatively connected to the shaft 76, whereby the flow of air from source 21 through regulator 135 will be supplied to and exhausted from opposite sides of the piston 36 in cylinder 17. A spring 100 is disposed on shaft 76 in the path of an arm 96 carried by actuator rod 24, to assure the availability of energy for abrupt operation of valve 23 from a bit-advancing position to a bit-withdrawing position. In addition, in order to effect electrical actuation of valve 23, a solenoid 93 having a plunger 109 may be provided which, through mechanism particularly shown in my above mentioned patent, is adapted to actuate valve 23.

Further, if desired, stabilizer means may be employed as more particularly disclosed in my aforementioned patent, including a cylinder 118, a piston rod 119 having a piston slidable in the cylinder 118, the rod passing through a limit sleeve 120 on which is a stop collar 133. At the end of sleeve 120 is a control knob 169. This stabilizer means forms no part of the invention hereof and therefore need not be further described, except to indicate that means would be provided for connecting actuator shaft 24 of the power cylinder 16 to the stabilizer shaft or rod 119 by lost motion connection (not shown) for limited relative movement, and in addition, the cylinder 118 is preferably interposed between plates 18 and 19 of power device 16, whereby plates 18 and 19 are symmetrical, as evidenced in Fig. 7.

Use and operation of the powered driving apparatus for controlling the longitudinal position of bit 13 will now be described in detail.

The apparatus is applied to drill press 10 with driving means 16 (Figure 1) anchored to standard 11 by cooperative clamp members 29 and 31 (Figure 2). A bushing 58 (Figures 3 and 4) of proper internal diameter to fit snugly on shaft 14 of drill press 10 is selected and anchored to shaft 14 by set screw 159. Sleeve 61 is slipped over bushing 58 and anchored thereto by set screw 60, thereby providing support for housing 20 of the apparatus. In this manner each end of the apparatus, 16 and 20, is supported on drill press 10. Any slight discrepency in the mounting is absorbed in the pliant mounting means at ends 40 and 45 of rods 33 and 35, respectively.

With the apparatus securely mounted to drill press 10, three types of operation are possible: manual, mechanically controlled power, or electrically controlled power.

For manual operation, it is necessary only to juxtapose handles 15 and 69 from their positions shown in Figures 4, 5 and 6, thus causing balls 70 to seat in recesses 74. This relieves pressure on sleeve 67 and allows shaft 14 to be manually turned by juxtaposed actuation of handles 15 and 69. Sleeve 67 and the remainder of the power driven assembly are effectually de-coupled from shaft 14 during this operation, and the operator controls press 10 as though the apparatus of this invention were not present.

When bit 13 has advanced far enough into work 28, for example after passing through work 28, knob 88 is turned, until spring 100 is compressed sufficiently so that upon release of knob 88 shaft 76 will be actuated by spring 100 to the bit-withdrawing position.

Work piece 28 may then be removed and another, identical operation performed by placing another work piece 28 beneath guide 27 and pushing in on knob 88 as described above.

While the specific details of the invention have been herein shown and described with reference to a drill press as more particularly disclosed in my Patent No. 2,624,319 to which reference may be had for a clearer understanding of the environment of the present invention, changes and alterations may be resorted to without departing from the spirit of the invention as defined in the appended claims.

I claim:

1. Power feed apparatus for a machine having a rotatable shaft the angular position of which determines the position of a tool with respect to work, comprising: a fluid actuated cylinder having a piston therein, a rod connected to said piston and extending from said cylinder, the outer end of said rod having teeth therein forming a rack, a housing mounted on said shaft for angular adjustment relative thereto, holding means connected with said apparatus for retaining said apparatus in a selected position of angular adjustment about said shaft; said holding means including a clamp releasably engaged with a fixed portion of the machine; and increasing gearing means operatively connecting said rack and said rotatable shaft.

2. Power feed apparatus for a machine having a rotatable shaft the angular position of which determines the position of a tool with respect to work, comprising: a fluid actuated cylinder having a piston therein, a rod connected to said piston and extending from said cylinder; the outer end of said rod having teeth therein forming a rack; a housing; means in said housing for supporting said housing on said shaft for adjustment about the axis of said shaft; means supported by said housing extending to one side thereof and supporting said cylinder; clamping means connected with said last named means and having provision for adjustable connection thereof with a stationary part of said machine to hold said housing against movement out of angularly adjusted position; said housing having a portion enclosing and slidably supporting a part of said rack; and increasing gearing means mounted in said housing adapted to be mounted on said shaft; said increasing gearing means drivingly connecting said shaft and said part of said rack.

3. Power feed apparatus for a machine having a rotatable shaft the angular position of which determines the position of a tool with respect to work, comprising: a housing; means in said housing for pivotally supporting said housing on said shaft; a reciprocable member having a portion extending into said housing; increasing gearing means in said housing drivingly connected with said reciprocable member; said increasing gearing means including means adapted to be mounted on said shaft for driving connection with said shaft; means supported by said housing operable for driving said reciprocable member; and means adjustably connected with said last named means including a clamp for adjustable connection with a stationary part of said machine to restrain pivotal movement of said housing.

4. Power feed apparatus for a machine having a rotatable shaft the angular position of which determines the position of a tool with respect to work, comprising: a housing; means including a sleeve adapted to be mounted on said shaft and within said housing operable for supporting said housing for angular adjustment relative to said shaft; and means in said housing for rotating said shaft in either direction including increasing gearing means having a gear surrounding said shaft; means supported by said housing for driving said gearing means; and clamping means adjustably connected with said last named means including means for adjustably and releasably connecting said clamping means to a stationary part of said machine to hold said housing and parts supported by the housing in angularly adjusted positions relative to said shaft.

5. Power feed apparatus for a machine having a rotatable shaft the angular position of which determines the position of the tool with respect to work, comprising: a housing; means in said housing for surrounding said shaft and adjustably supporting the housing therefrom; a gear mounted in the housing for driving connection with said shaft; gearing means in said housing coacting with said gear; a rack coacting with said gearing means; means supported by said housing for adjustment therewith operable for reciprocating said rack to drive said gear through said gearing means; and means adjustably connected with said last named means including a clamp for adjustable connection with a stationary part of said machine for holding said housing in adjusted position.

6. A power feed unit for attachment to a machine having a rotatable shaft the angular position of which determines the position of a tool with respect to work, comprising: a housing; means embodied in said housing for surrounding said shaft in a manner permitting the housing to be angularly adjusted on said shaft so as to be supported by the shaft in a position best suited to the particular machine; means for holding said housing in said adjusted position on said shaft; a gear mounted in said housing for driving connection with said shaft; gearing means in said housing coacting with said gear; a rack coacting with said gearing means; and means supported by said housing for reciprocating said rack to drive said gear through said gearing means; said holding means projecting from said last named means and including clamping means for connecting said holding means with a stationary part of said machine.

7. Power feed apparatus for a machine having a rotatable shaft, the angular position of which determines the position of a tool with respect to work, comprising: a housing adapted to be disposed about said shaft; a sleeve rotatable in said housing and adapted to be disposed about said shaft; a pinion shaft in said housing in parallel spaced relation to said sleeve; a pinion gear on said pinion shaft; gear means interposed between said pinion shaft and said sleeve for rotating said sleeve; a rack extending into said housing into engagement with said pinion gear; and means for shifting said rack; an actuator cylinder; means supporting said cylinder on said housing with said rack having an extension extending into said cylinder; a piston on said extension in said cylinder for shifting said rack; and holding means connected with said apparatus for retaining said apparatus in a selected position of angular adjustment about said shaft; said holding means including a clamp releasably engaged with a fixed portion of the machine.

8. Power feed apparatus for a machine having a rotatable shaft, the angular position of which determines the position of a tool with respect to work, comprising: a housing adapted to be disposed about said shaft; a sleeve rotatable in said housing and adapted to be disposed about said shaft; a pinion shaft in said housing in parallel spaced relation to said sleeve; a pinion gear on said pinion shaft; gear means interposed between said pinion shaft and said sleeve for rotating said sleeve; a rack extending into said housing into engagement with said pinion gear; and means for shifting said rack; an actuator cylinder; means supporting said cylinder on said housing with said rack having an extension extending into said cylinder; and clamping means carried by said apparatus for adjustable connection to a fixed part of said machine for maintaining said housing in a fixed angular relation with respect to said shaft.

References Cited in the file of this patent

UNITED STATES PATENTS

| | | |
|---|---|---|
| 986,567 | Herr | Mar. 14, 1911 |
| 1,008,309 | Cushman | Nov. 14, 1911 |
| 1,888,091 | Oberhoffken | Nov. 15, 1932 |
| 2,116,166 | Christian | May 3, 1938 |
| 2,337,330 | Julin | Dec. 21, 1943 |
| 2,340,999 | Trott | Feb. 8, 1944 |
| 2,387,215 | Fawkes | Oct. 16, 1945 |
| 2,418,220 | Churchill | Apr. 1, 1947 |
| 2,476,154 | Lohs | July 12, 1949 |